Dec. 4, 1951  E. R. SPITTLER ET AL  2,577,163
RESISTANCE WELDING AND RESISTANCE WELD TESTING
Filed May 4, 1944  2 SHEETS—SHEET 1

Inventors:
Eugene R. Spittler,
Ivar W. Johnson,
by Harry E. Dunham
Their Attorney.

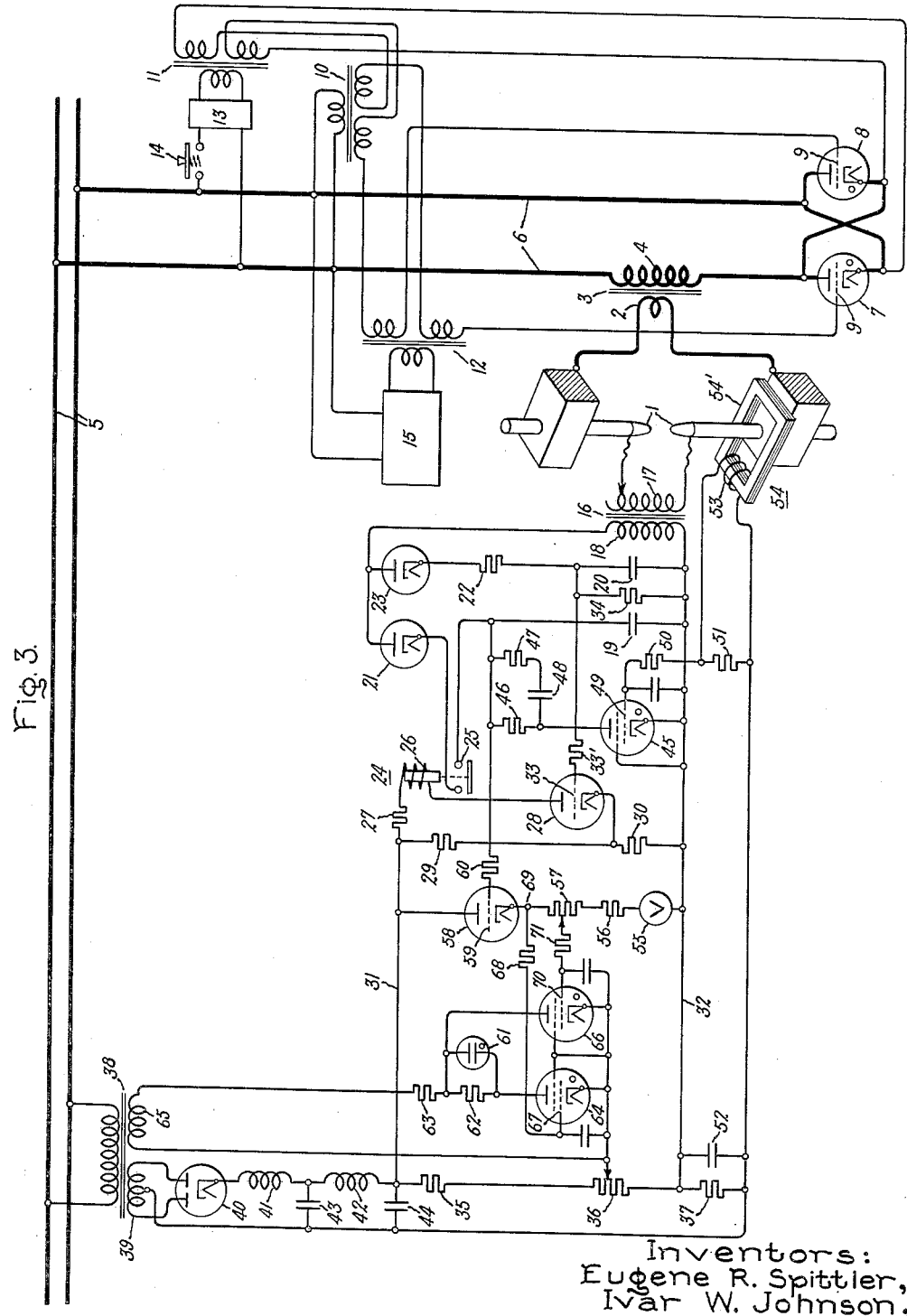

Patented Dec. 4, 1951

2,577,163

UNITED STATES PATENT OFFICE 2,577,163

RESISTANCE WELDING AND RESISTANCE WELD TESTING

Eugene R. Spittler and Ivar W. Johnson, Schenectady, N. Y., assignors to General Electric Company, a corporation of New York Application May 4, 1944, Serial No. 534,010

5 Claims. (Cl. 219—10)

Our invention relates to resistance welding and to resistance weld testing.

A resistance welded structure is usually designed to meet certain strength requirements which depend in large measure on the individual strength of each resistance weld employed in its fabrication. Procedures may be established which will produce resistance welds of a desired strength, but variable factors thereof may result in the formation of one or more defective welds which will weaken the welded structure sufficiently to make it unsafe for its intended use.

Procedures have been proposed for controlling resistance welding operations in order to produce welds of desired strength and for testing welds made in accordance with established resistance welding procedures to determine when uncontrollable variables of such procedures have resulted in the formations of unsatisfactory welds.

It is an object of our invention to provide an improved procedure for forming resistance welds of desired strength.

It is also an object of our invention to provide an improved non-destructive test for determining by electrical means the quality of a resistance weld formed in accordance with a preestablished resistance welding procedure.

Further objects of our invention will become apparent from a consideration of the following description thereof.

In the formation of a resistance weld, electric current is supplied for a predetermined time interval to the parts to be joined through the agency of pressure-exerting electrodes. We have discovered that the variation in closed circuit voltage across a resistance weld during its formation is a satisfactory criterion of its quality. We have determined that in the case of ferrous metals, the voltage across the weld increases in value as the weld is formed and becomes substantially constant upon the formation of a satisfactory weld. We have also determined that in the formation of non-ferrous welds, such as welds between parts of aluminum, aluminum alloys, brass, and the like, the voltage across the weld decreases in value as the weld is formed and again attains a substantially constant value when a weld of satisfactory quality has been formed.

In accordance with our invention we employ this variation in voltage across a resistance weld during its formation as a means for controlling the resistance welding operation or as a means for indicating when a satisfactory weld has been formed by a preestablished welding procedure.

Figure 1:
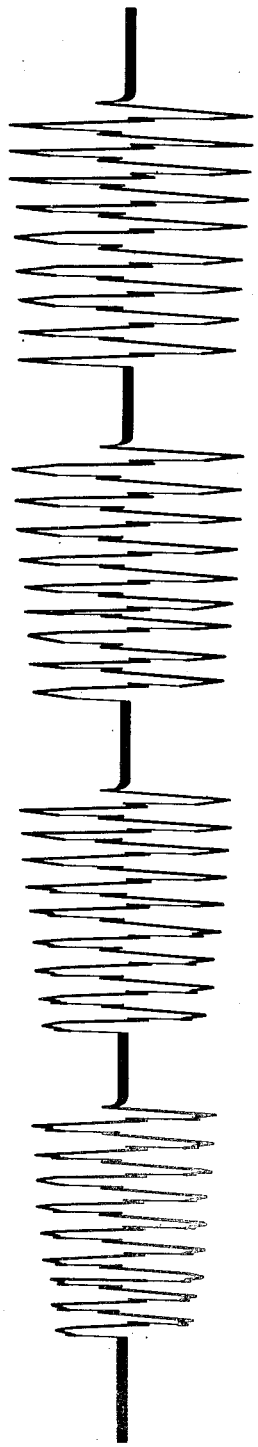
Figure 2:
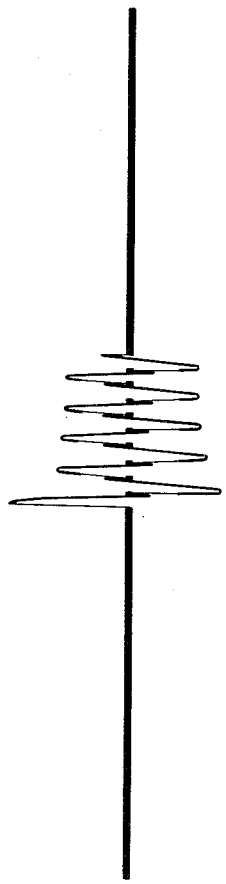

The nature of our discovery has been illustrated by the oscillograms of Figs. 1 and 2 of the drawings which show respectively variations in the voltage across welds between ferrous metals and between non-ferrous metaals. In Fig. 3 of the drawings we have illustrated apparatus for testing welds in accordance with our invention. This apparatus may also be used by a welding operator as a means for enabling him to control a resistance welding operation in accordance with our invention.

The oscillogram shown in Fig. 1 was obtained by recording the voltage across the electrodes of a resistance welding machine during the welding of sheets of ferrous metal by means of the procedure disclosed and claimed in United States Letters Patent 2,046,969, James H. Redmond, granted July 7, 1936, and assigned to the assignee of this invention.

In accordance with this co-called interrupted spot welding procedure, four applications of alternating current flow each of nine cycles duration and each separated from the other by an interruption in the current flow of three cycles duration were employed in making the weld. It will be noted that during each application of current flow, the voltage across the welding electrodes progressively increased in amount and that at the beginning of each application of current flow the voltage of the first half cycle was less than the voltage of the last half cycle of the preceding application of current flow. However, during the entire welding period it will be noted that the voltage across the electrodes progressively increased in amount until it finally reached a substantially constant value during the last three cycles of the last application of current flow.

The oscillogram of Fig. 2 is a graphic illustration of the voltage condition across the electrodes of resistance welding machine during the formation of an aluminum weld formed by one application of alternating current of five cycles duration. In this case, it will be noted that the voltage across the electrodes was a maximum at the start of the welding operation and decreased to a substantially constant value during the last two cycles of current flow. In this case, as in the preceding instance, we discovered that the substantially constant voltage value at the end of the welding period indicated the formation of a weld of desired quality.

In view of our discovery it is, of course, apparent that if the welding operation is interrupted when the voltage across the weld attains a substantially constant value a procedure will have been established for uniformly obtaining welds of desired strength and quality. Otherwise stated this method of weld control for multiple resistance welding comprises connecting the work piece in a welding circuit having therein a weld energy control means which is operated to interrupt the welding operation after the application of a welding voltage through the work piece produces sufficient heat energy to develop such fusion of the work piece as results in a voltage change at the weld point to substantially a constant value as indicated by a suitable measuring instrument. On the other hand, if a welding operation is performed in accordance with an established procedure whereby current flow is maintained for a predetermined time interval, it is possible in accordance with our discovery to measure the voltage across the weld at the end of the timed application of welding current flow and compare this measurement with a predetermined standard measurement obtained in like manner for welds of desired quality and thereby determine the quality of each weld made in accordance with the established procedure.

Many arrangements will occur to those skilled in the art for making use of our discovery in the manner above disclosed for controlling resistance welding operations and for testing resistance welds formed in accordance with a pre-established procedure.

One form of apparatus which we have used is illustrated in Fig. 3 of the drawings. This apparatus forms the subject matter of application, Serial No. 534,120, Orrin W. Livingston, for Electric Control Circuits filed concurrently herewith, assigned to the same assignee as our present invention and now Patent No. 2,440,962, granted May 4, 1948.

The electric control circuit of Fig. 3 is in reality a special type of vacuum tube voltmeter which gives an indication of the magnitude of the last half cycle of alternating current flow employed in making a weld. It also embodies an alarm or signal device by means of which this last half cycle value is compared with a standard value so that departures from operational limits will become apparent to the operator by the operation of the alarm. The system embodies a capacitor which is charged during a welding operation to a voltage proportional to the maximum value occurring during each half cycle of polarity corresponding to that of the last half cycle of the energization period of the welding circuit. This capacitor is discharged during half cycles of a polarity opposite that of the last half cycle of the energization period of the welding circuit. Consequently, at the end of a welding period the last half cycle charge on the capacitor is maintained during the immediately following period of deenergization of the welding circuit and means in the circuit are provided for indicating the value of this charge. As previously stated, means are also provided for comparing the magnitude of this capacitor charge with a predetermined standard value for welds of desired quality and for warning the welding operator when the last half cycle value of voltage for a welding period does not fall within desired operational limits and, consequently, furnishes evidence of the formation of an unsatisfactory weld.

In the system shown in Fig. 3 the electrodes 1 of a resistance welding machine are connected to the terminals of the secondary 2 of a welding transformer 3 having a primary winding 4. The primary winding 4 of the welding transformer is connected to a source of alternating current supply 5 through conductors 6 and a pair of electric valves 7 and 8 which are reversely connected in parallel with one another. These electric valves may be of the type employing an immersion igniter control element or, as illustrated, may include a heated cathode and utilizing an ionizable medium such as a gas or vapor.

Each of these electric valves 7 and 8 is provided with a control element 9 whose energization is controlled to determine the cycles and the instant in each cycle that the associated valve is rendered conductive. The excitation circuits for controlling the energization of these control elements may be of any of the types well known in the art and in Fig. 3 have been illustrated as including a transformer 10 for applying a component of alternating current voltage to the control elements 9 which is in phase opposition to the anode-cathode voltages of electric valves 7 and 8 and transformers 11 and 12 for supplying components of alternating current voltage to these control elements which are in phase with their anode-cathode voltages.

Transformer 11 forms part of a timer 13 by means of which it is intermittently energized from the alternating current supply circuit 5 through the agency of a manually operated initiating switch 14. Transformer 12 forms part of a heat control 15 by means of which the component of voltage derived from transformer 12 is adjusted in phase with respect to the anode-cathode voltages of electric valves 7 and 8 in order to control the magnitude of the current which it is desired to supply to the load circuit. The relative magnitudes of the control voltages in the excitation circuits of electric valves 7 and 8 is such that both the in phase components supplied by transformers 11 and 12 are required to render electric valves 7 and 8 conducting. In this way the timer determines the cycles during which the valves conduct and the phase of the voltage derived from the heat control determines the time in the cycle that conduction is initiated. The component of voltage supplied by transformer 12 is preferably of peaked wave form and the heat control 15 may also embody current regulating means. Device 15 may be of any of the types known in the art and may to advantage be of the type described and claimed in the copending application of Benjamin Cooper, Serial No. 480,150, filed March 23, 1943, assigned to the assignee of this invention and now Patent No. 2,421,994, granted June 10, 1947.

As will be well understood by those skilled in the art the resistance welding system thus far described is placed in operation by closing manual switch 14. Thereafter welding transformer 3 is energized for an interval or a succession of intervals under the control of timer 13 with a current having a magnitude depending upon the operation of heat control 15.

As previously stated, we have discovered that the magnitude of the voltage across a resistance weld for the last half cycle of welding time may be used as a measure of weld quality. In the system illustrated in Fig. 3 this voltage is introduced into the weld indicator through the agency of a control transformer 16 having its primary 17 connected to the electrodes 1 of the welding machine at points near their work engaging surfaces. The terminals of the secondary 18 of transformer 16 are connected to the parallel charging circuits for capacitors 19 and 20.

Capacitor 19 is charged through a unidirectional current conducting device 21 which is poled and connected across electrodes 1 through transformer 16 to pass current to the capacitor during half cycles of a polarity corresponding to the last half cycle of an energization period of the load circuit which in the arrangement illustrated comprises the weld being formed between these electrodes. Capacitor 20 is charged in the same manner through a resistor 22 and a second unidirectional current conducting device 23 which is poled in the same manner as unidirectional current conducting device 21. Device 21 and 23 may be of any suitable type and have been illustrated in the drawing as electric discharge devices.

Capacitor 19 is employed for measuring the voltage across the weld and capacitor 20 forms part of a time delay circuit including a relay 24 having contacts 25 in the charging circuit of capacitor 19. This relay operates in a manner to open the charging circuit of capacitor 19 a short interval of time after the flow of welding current ceases and before electrodes 1 of the welding machine are withdrawn from the work. Consequently, any sparking between the electrodes and the work at the time the electrodes disengage the work is prevented from increasing the charge on capacitor 19 which, as will be pointed out below, has a value depending upon the maximum value of the last half cycle of voltage across the electrodes at the end of a weld period.

The operating winding 26 of relay 24 is connected in the anode-cathode circuit of a three-element electric valve 28 of the high vacuum type and in circuit with a resistance element 27 across a resistance element 29. This resistance element forms part of a voltage divider comprising resistance elements 29 and 30 connected in series with one another across a source of direct current voltage 31, 32. Control element 33 of electric valve 28 is connected through a resistance element 33' to the positive terminal of capacitor 20. This capacitor is also provided with a discharge circuit including a resistance element 34.

The source of direct current voltage 31, 32 may be obtained in any suitable manner. In the arrangement illustrated it is obtained from a voltage divider including a resistance element 35, a potentiometer 36, a resistance element 37 connected in series with one another across the output circuit of a full-wave rectifier. This rectifier is connected to the source of alternating current supply 5 by means of a transformer 38 having a mid-tapped secondary winding 39 connected with the arc discharge device 40 to provide full-wave rectification. The output of this rectifier is filtered by means of inductances 41 and 42 and capacitors 43 and 44 and applied across the voltage divider 35, 36, 37.

Assuming that the last half-cycle of current flow between welding electrodes 1 during a welding period is a positive polarity, the connections of capacitors 19 and 20 through unidirectional conducting devices 21 and 23, and transformer 16 are such that current will flow and produce a charge on these capacitors, assuming, of course, that the circuit for capacitor 19 is completed through the contacts 25 of relay 24. During the first positive half-cycle the charge on capacitor 20 will become sufficient to overcome the negative bias voltage across resistance element 30 between control element 33 and the cathode of electric valve 28 thereby rendering this valve conducting to energize the operating winding 26 of relay 23. This relay will thereupon close its contacts 25 and complete the charging circuit of capacitor 19. At the end of a welding period, capacitor 20 will be discharged through its parallel-connected resistor 34 and the negative bias across resistance element 30 will again render electric valve 28 non-conducting thereby causing relay 24 to open its contacts 25. Thereafter when electrodes 1 are separated from the work, if any sparking occurs between them and the work due to the inductance of the secondary circuit of the welding transformer, the voltage across these electrodes during such sparking can in no way increase the charge imparted to capacitor 19 by the last half-cycle of welding current flow.

Capacitor 19 is discharged in response to half cycles of a polarity opposite that of the last half cycle of an energization period of the resistance welding transformer 3 through the agency of an electric valve 45 of the type employing an ionizable medium such as a gas or vapor. The anode-cathode circuit of electric valve 45 is connected in circuit with a current limiting resistance element 46 across the terminals of capacitor 19. In order to insure that electric valve 45 commutates out successfully after discharging capacitor 19, a series connected resistance element 47 and capacitor 48 are connected in the anode-cathode circuit of this valve across the load limiting resistance element 46.

The control element 49 of electric valve 45 is connected through resistance elements 50, 51 and 37 to its cathode. Resistance element 37 is shunted by a capacitor 52 and resistance element 51 is shunted by the secondary winding 53 of a control transformer 54.

The primary of control transformer 54 is actually the secondary of the welding transformer 3. In the arrangement illustrated this result has been obtained by placing its magnetic core structure 55 about the lower electrode 1 on the arm of the welding machine by means of which this electrode is supported. This transformer 54 is a saturable inductive device, that is, its core structure 54' is readily saturated by small values of current flow in the welding circuit. Consequently, the output voltage of its secondary 53, which also appears across resistance element 51, is a sharp peak affair which occurs at the point where the current in the welding circuit increases from or decreases to zero value. At such times the peak voltage wave derived from control transformer 54, when of proper polarity, overcomes the negative bias voltage across resistance element 37 and capacitor 52 to render electric valve 45 conductive and thereby discharge capacitor 19. The secondary winding 53 of control transformer 54 is connected so that the last half-cycle of current flow in the welding circuit will not produce a positive peak of voltage and consequently will not render electric valve 45 conductive so that the final charge on capacitor 19 due to the last half cycle of welding current flow will be maintained during the immediately following period of deenergization of the welding circuit.

The voltage value of capacitor 19 is indicated by a milliammeter 55 connected in circuit with a resistance element 56, a potentiometer 57, and the anode-cathode circuit of an electric valve 58 across the direct current source of supply 31, 32. The control element 59 of electric valve 58 is connected through a resistance element 60 to the positive terminal of capacitor 19. Electric valve 58 is of the high vacuum type and is connected in a cathode following manner to record the voltage across capacitor 19. In order to provide a range adjustment for the milliammeter 55, which is functioning as a voltmeter, resistance element 56 may be made adjustable.

Means may be provided for operating a signal when the voltage of capacitor 19 due to the last half-cycle of welding current flow is not within certain operational limits previously established as necessary for obtaining a satisfactory weld. In the system of Fig. 3 the signal device is an electric discharge device 61 which is illuminated only when the voltage of condenser 19 is within the limits established for a good weld. This electric valve 61 is connected across a resistance element 62 in circuit with a resistance element 63, and the anode-cathode circuit of an electric valve 64 across the secondary 65 of transformer 38. The anode-cathode circuit of an electric valve 66 is connected in shunt to the anode-cathode circuits of the series connected electric valves 61 and 64. Consequently, when electric valve 64 becomes conductive, electric valve 61 will be illuminated by reason of its connection across the secondary 65 of transformer 38. On the other hand, when electric valve 66 becomes conductive, electric valves 61 and 64 are shunted down and electric valve 61 thereby extinguished.

The cathodes of electric valves 64 and 66 are connected to the slider of potentiometer 36 forming part of the voltage divider 35, 36, 37. The control element 67 of electric valve 64 is connected through resistance element 68 to a terminal 69 of the cathode following circuit embodying electric valve 58 and the control element 70 of electric valve 66 is connected through a resistance element 71 to the slider of potentiometer 57 in this cathode following circuit. Consequently, the position of the slider on potentiometer 36 determines the lower limit of voltage in the cathode following circuit at terminal 69 which will render electric valve 64 conductive and the position of the slider on potentiometer 57 will determine the upper limit of voltage in the cathode following circuit which will not render electric valve 66 conductive. Thus, if the voltage of condenser 19 and consequently the voltage of terminal 69 in the cathode following circuit does not equal the value of voltage determined by the position of the slider on potentiometer 36, electric valve 64 will not be made conductive and consequently electric valve 61 will not be illuminated thereby indicating the formation of a defective weld. On the other hand, if the voltage across capacitor 19 and consequently the voltage of terminal 69 of the cathode circuit is greater than a predetermined value, the voltage determined by the position of the slider on potentiometer 57 in the cathode following circuit will be sufficient to render electric valve 66 conductive, and by shunting electric valves 61 and 64 will extinguish electric valve 61 and again indicate the formation of an unsatisfactory weld. Only when the voltage of the capacitor 19 and the terminal 69 of the cathode following circuit of electric valve 58 is within the limits established by potentiometers 36 and 57 will the electric valve 61 be illuminated indicating the formation of a satisfactory weld.

In the system illustrated electric valves 45, 64 and 66 are provided with shielding grids which are connected to the cathodes of these valves. Transient suppressing condensers are also connected between the control elements and cathodes of these electric valves.

Although the operation of the system of Fig. 3 is believed to be apparent from the foregoing detailed description thereof, it may be briefly summarized as follows:

Closure of initiating switch 14 will cause welding transformer 3 to be energized one or more times from the source of alternating current supply 5 depending on the control exerted on electric valves 7 and 8 by timer 13. Each period of energization will last for a predetermined number of half cycles ending with a half cycle of the same polarity and the periods of energization will be separated from one another by predetermined periods of deenergization if more than one period of energization is occasioned by timer 13. The magnitude of the current flow will depend upon the adjustment of heat control 15.

Assuming that the last half cycle value of an energization period of the welding circuit is of positive polarity, control transformers 16 and 54 of the indicating circuit are properly connected to charge capacitors 19 and 20 during positive half cycles of current flow and to discharge capacitor 19 at the end of a negative half cycle of current flow in the welding circuit.

The first positive half cycle of current flow in the welding circuit will induce a voltage in secondary 18 of control transformer 16 in a direction to charge capacitor 20 through unidirectional current conducting device 23 and resistance element 22. The charge thus imparted to capacitor 20 will overcome the negative bias voltage across resistance element 30 and impress between control element 33 and the cathode of electric valve 28 a positive value of voltage sufficient to render this valve conducting. Conductivity of electric valve 28 will energize operating winding 26 of relay 24 through resistance element 27 in response to the direct current voltage appearing across resistance element 29 of voltage divider 29, 30 connected across the direct current source of supply 31, 32. This energization of relay 26 will cause it to close its contacts 25 thereby completing the charging circuit for capacitor 19. Consequently, the next positive half cycle of current flow in the welding circuit will charge capacitor 19 through the unidirectional current conducting device 21 to a maximum value of voltage corresponding to that of the voltage occurring across the welding electrodes 1.

At the end of the first negative half cycle of current flow in the welding circuit, transformer 54 will produce a positive peak of voltage in its secondary winding 53. This secondary winding 53 is connected across a resistance element 51 in the control circuit of electric valve 45 and the positive peak of control voltage generated in its secondary winding 53 will be sufficient to overcome the negative bias voltage of resistance element 37 also connected in the excitation circuit of electric valve 45. Consequently, control element 49 of electric valve 45 will become positive relative to its cathode causing it to become conductive and discharge capacitor 19 through resistance element 46. Resistance element 47 connected in series with capacitor 48 across resistance element 46 will cause electric valve 45 to commutate out successively after discharging capacitor 19.

Thereafter, during positive half cycles of current flow in the welding circuit capacitor 19 will be charged and at the end of negative half cycles of current flow it will be discharged. Consequently, at the end of a welding period which has been assumed ends with a half cycle of positive polarity, capacitor 19 will be left with a charge depending on the maximum value of the voltage across the welding electrodes 1.

Shortly after a welding period capacitor 20 will have discharged sufficiently through resistance element 34 to reduce the current flow through electric valve 28 to a value that will cause relay 24 to open its contacts 25. Consequently, any residual voltage of the welding circuit will not be impressed on capacitor 19 when electrodes 1 are separated from the work and thereby give a false indication of the magnitude of the last half cycle value of welding current flow previously recorded as a charge on the capacitor. To accomplish this purpose, it is only necessary that before the welding electrodes are separated from the work after a welding operation, capacitor 20 be discharged sufficiently through the circuit including resistance element 34 to cause electric valve 28 to decrease the energization of relay 24 enough to cause it to open its contacts 25 in the charging circuit of capacitor 19.

Control element 59 of electric valve 58 is connected to be responsive to the charge on capacitor 19. Consequently, at the end of a welding period electric valve 58 will be rendered conductive in accordance with the charge on capacitor 19 causing a current flow through milliammeter 55 corresponding in magnitude to the voltage of capacitor 19. The deflection of the pointer of milliammeter 55 will thus indicate the magnitude of the voltage of capacitor 19. This indication will be maintained during the deenergization period of the welding circuit and, consequently, may be readily observed by the welding operator after each welding operation.

The charge on capacitor 19 also causes terminal 69 of the cathode following circuit including electric valve 58 to attain a corresponding value. This voltage value is applied to control element 67 of electric valve 64 and if greater than the cathode potential of this valve will cause it to become conductive thereby connecting electric valve 61 across the secondary 65 of transformer 38. The minimum value of voltage necessary to render electric valve 64 conducting is determined by the cathode potential thereof and this in turn is determined by the position of the slider of potentiometer 36 of the voltage divider 35, 36 and 37. Consequently, if the voltage of terminal 69 does not attain the value determined by the position of the slider on potentiometer 36, electric valve 64 will not become conductive and electric valve 61 will not be illuminated by being connected across secondary 65 of transformer 38. Potentiometer 36 thus furnishes an adjustment for the minimum value of voltage across capacitor 19 which will operate signal device 61.

The cathode potential of electric valve 66 is also determined by the adjustment of the slider on potentiometer 36. The voltage applied to its control element 70, however, is dependent upon the adjustment of the slider of potentiometer 57 in the cathode following circuit including electric valve 58. Consequently, if the potential of terminal 69 of this cathode following circuit increases beyond a predetermined value for a given adjustment of potentiometer 57, electric valve 66 will become conductive. When electric valve 66 becomes conductive it completes a shunt circuit about electric valves 61 and 64 and extinguishes electric valve 61 whose circuit has been previously completed by electric valve 64 becoming conductive. Consequently, if the voltage across capacitor 19 is greater than a predetermined value determined by the position of the slider of potentiometer 57 signal device 61 is not energized. It is thus seen that only when the voltage of capacitor 19 is between predetermined limits is signal device 61 operated to inform the welder that a satisfactory weld has been made.

When the welding circuit is again energized to make the next weld, the first half cycle of negative current flow will, in the manner described, cause electric valve 45 to discharge capacitor 19. Thereafter the operation of the circuit will be as above described and at the end of the next welding operation, capacitor 19 will acquire a charge indicative of the quality of the next weld thus formed.

From the above description of the electric control circuit shown in Fig. 3, it is apparent that when welding in accordance with a preestablished procedure, the welding operator by observing instrument 55 or signal device 61 thereof at the end of each welding operation may determine whether a satisfactory weld has been made.

It is also apparent that when the flow of welding current is subject to the control of the welding operator, the electric control circuit of Fig. 3 may be used in order to tell the operator when a satisfactory weld has been formed so that he may thereupon interrupt the flow of welding current. It is also apparent that by slightly modifying the circuit of Fig. 3 by substituting for the signal device 61 a suitable relay having its contacts connected to control the excitation circuits of electric valves 7 and 8, the flow of welding current may be automatically interrupted when the voltage across the weld attains a predetermined value.

It is, of course, not necessary to employ the particular circuit illustrated in Fig. 3 in order to make use of our discovery for resistance welding control and resistance weld testing since other arrangements will occur to those skilled in the art. Thus, for example, one may use the control circuit illustrated in Fig. 3 of application, Serial No. 534,082, Benjamin Cooper and Charl D. Cillie for Electric Control Circuits filed concurrently herewith, assigned to the same assignee as our invention and now Patent No. 2,440,932, granted May 4, 1948.

Various arrangements may be employed for obtaining the voltage across the resistance weld. It is not necessary to obtain this voltage through the agency of the resistance welding electrodes. If, however, they are employed for this purpose it is desirable to make the connections of the voltage responsive circuit as close as possible to their work engaging surfaces. It is, of course, apparent that separate probe electrodes which are moved into and out of engagement with the work when the welding electrodes are moved into and out of engagement with the work may be used for completing a circuit for measuring the voltage across the resistance weld. Such probes may form an integral part of the electrodes of the resistance welding machine or they may be applied as an attachment thereto. The work engaging surface of such probe electrodes may be made pointed and provided with means for causing them to pierce the outside surface of the work assembly being joined by the resistance welding operation so that the outside surface condition of these parts will not interfere with the attaining of a correct measurement of the voltage drop across the weld being made.

These and other arrangements will occur to those skilled in the art in view of the above disclosure of our discovery of the variation in voltage condition across a weld during its fabrication. In most cases the welding operation will be performed with alternating current and for this reason our invention has been described with regard to welds thus made. It is, of course, apparent that the underlying principles of our invention will also apply when welds are made with direct current. When the weld is produced by the discharge of energy stored in an inductance or in a capacitor it may be necessary to determine the voltage variation across the weld during a predetermined period in the current flow period which is critical to the formation of the weld.

In view of the disclosures above made with regard to our invention many variations and modifications thereof, other than those referred to, will occur to those skilled in the art to which it relates and we, therefore, aim to cover by the appended claims all such modifications within the true spirit and scope of our invention.

What we claim as new and desire to secure by Letters Patent of the United States is:

1. The method of resistance welding metallic work parts which comprises supplying welding current to said work parts through the agency of pressure exerting electrodes in order to form a weld between said parts, measuring the voltage across said weld during its formation, and interrupting the flow of welding current through said electrodes when the voltage across said weld attains a substantially constant value.

2. The method of resistance welding metallic work parts which comprises supplying weld forming alternating current to said work parts through the agency of pressure exerting electrodes to form a resistance weld between said parts, measuring during the formation of said weld the cyclic variations of voltage across said weld, and interrupting the flow of welding current when the cyclic values of voltage across said weld become substantially constant.

3. The method of resistance welding which comprises applying welding current to metallic work parts through the agency of pressure exerting electrodes to form a weld therebetween, measuring the voltage across said weld during its formation, interrupting the flow of welding current when the voltage measured across said weld attains a substantially constant value and thereby providing the timed application of current flow used in forming said weld, forming additional welds between metallic work parts like those used in forming said first mentioned weld by applying said timed application of welding current flow to said work parts through said pressure exerting electrodes, measuring the voltage across any one of said additional welds at the end of the welding operation by which it was formed, and providing an indication whenever said measured voltage departs a predetermined amount from said substantially constant voltage value used in providing said timed application of welding current flow for said first mentioned weld.

4. A method of weld control for multiple resistance welding, which comprises connecting a workpiece in a welding circuit having welding energy control means, applying a welding voltage through the workpiece until the heat energy develops such fusion of the material of said workpiece as results in a voltage change at the weld point to substantially a constant value, providing an indication of said voltage change to said substantially constant value, and operating said welding energy control means to interrupt a welding operation after obtaining said indication of said voltage change to said substantially constant value.

5. A method of weld control for multiple resistance welding, which comprises connecting a workpiece in a welding circuit having welding energy control means, applying a welding voltage through the workpiece until the heat energy develops such fusion of the material of said workpiece as results in a voltage change at the weld point to substantially a constant value, and operating said welding energy control means to interrupt a welding operation after obtaining said voltage change to said substantially constant value.

EUGENE R. SPITTLER.
IVAR W. JOHNSON.

REFERENCES CITED

The following references are of record in the file of this patent:

UNITED STATES PATENTS

| Number | Name | Date |
| --- | --- | --- |
| 1,959,690 | Roth | May 22, 1934 |
| 2,149,558 | Stansbury et al. | Mar. 7, 1939 |
| 2,264,047 | McDowell | Nov. 25, 1941 |
| 2,306,593 | Collom | Dec. 29, 1942 |
| 2,370,009 | Clark et al. | Feb. 20, 1945 |
| 2,433,967 | Van Sciver | Jan. 6, 1948 |